US011373519B2

(12) United States Patent
Grimm et al.

(10) Patent No.: US 11,373,519 B2
(45) Date of Patent: Jun. 28, 2022

(54) TRAFFIC SIGNAL MANAGEMENT FOR AUTONOMOUS VEHICLE OPERATION

(71) Applicant: GM Global Technology Operations LLC, Detroit, MI (US)

(72) Inventors: Donald K. Grimm, Utica, MI (US); Fan Bai, Ann Arbor, MI (US); Bo Yu, Troy, MI (US); Vivek Vijaya Kumar, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 16/679,791

(22) Filed: Nov. 11, 2019

(65) Prior Publication Data
US 2021/0142658 A1    May 13, 2021

(51) Int. Cl.
| | |
|---|---|
| *G06K 9/00* | (2022.01) |
| *G08G 1/01* | (2006.01) |
| *G08G 1/07* | (2006.01) |
| *G06V 20/20* | (2022.01) |
| *G06V 20/58* | (2022.01) |

(Continued)

(52) U.S. Cl.
CPC .......... *G08G 1/0112* (2013.01); *G06V 20/20* (2022.01); *G06V 20/584* (2022.01); *G06V 20/588* (2022.01); *G08G 1/07* (2013.01); *G05D 1/0088* (2013.01); *G05D 2201/0213* (2013.01); *G06V 2201/08* (2022.01)

(58) Field of Classification Search
CPC .. G08G 1/0112; G08G 1/07; G08G 1/096775; G08G 1/096725; G08G 1/0129; G08G 1/012; G08G 1/09623; G08G 1/0133; G08G 1/0145; G06K 9/00825; G06K 9/00798; G06K 9/00671; G06K 2209/23; G05D 2201/0213; G05D 1/0088
See application file for complete search history.

(56) References Cited

U.S. PATENT DOCUMENTS

| | | | |
|---|---|---|---|
| 2018/0181884 A1 | 6/2018 | Rolle et al. | |
| 2019/0023266 A1* | 1/2019 | Kouri | G01C 21/32 |
| 2019/0251838 A1* | 8/2019 | Bernhardt | G08G 1/096822 |

(Continued)

FOREIGN PATENT DOCUMENTS

CN    104411559 A    3/2015

OTHER PUBLICATIONS

Chinese Office Action for CN Application No. 202011245439.2, dated Apr. 11, 2022, pp. 1-10.

*Primary Examiner* — Dhaval V Patel
(74) *Attorney, Agent, or Firm* — Cantor Colburn LLP

(57) ABSTRACT

Systems and methods to perform traffic signal management for operation of autonomous vehicles involve obtaining vehicle data from two or more vehicles at an intersection with one or more traffic lights. The vehicle data includes vehicle location, vehicle speed, and image information or images. A method includes determining at least one of three types of information about the one or more traffic lights based on the vehicle data. The three types of information include a location of the one or more traffic lights, a signal phase and timing (SPaT) of the one or more traffic lights, and a lane correspondence of the one or more traffic lights. The method also includes providing the at least one of the three types of information about the one or more traffic lights for the operation of autonomous vehicles.

20 Claims, 6 Drawing Sheets

(51) Int. Cl.
*G06V 20/56* (2022.01)
*G05D 1/00* (2006.01)

(56) References Cited

U.S. PATENT DOCUMENTS

2020/0004268 A1* 1/2020 Park .................. G01C 21/32
2020/0047771 A1* 2/2020 Yoon ............... B60W 30/18159
2021/0004611 A1* 1/2021 Garimella .............. G08G 1/166
2021/0088352 A1* 3/2021 Nishida .............. G01C 21/3658

* cited by examiner

TRAFFIC SIGNAL MANAGEMENT FOR AUTONOMOUS VEHICLE OPERATION

INTRODUCTION

The subject disclosure relates to traffic signal management for autonomous vehicle operation.

Autonomous operation of a vehicle requires information gathering and decision making at rates that are sufficiently high to act in and react to real-time situations. Exemplary vehicles that may be operated autonomously include automobiles, trucks, constructions equipment, farm equipment, and automated factory equipment. Autonomous operation requires a vehicle to observe and consider many of the same inputs as a driver. For example, when approaching an intersection, the autonomous vehicle must observe and consider the color of the illuminated light. To do this, the autonomous vehicle must first determine exactly where the traffic light is in the field of view. The autonomous vehicle must also determine which traffic light corresponds with the lane in which the autonomous vehicle is travelling. Accordingly, it is desirable to provide traffic signal management for autonomous operation.

SUMMARY

In one exemplary embodiment, a method of performing traffic signal management for operation of autonomous vehicles includes obtaining vehicle data from two or more vehicles at an intersection with one or more traffic lights. The vehicle data includes vehicle location, vehicle speed, and image information or images. The method also includes determining at least one of three types of information about the one or more traffic lights based on the vehicle data. The three types of information include a location of the one or more traffic lights, a signal phase and timing (SPaT) of the one or more traffic lights, and a lane correspondence of the one or more traffic lights. At least one of the three types of information about the one or more traffic lights is provided for the operation of autonomous vehicles.

In addition to one or more of the features described herein, the determining the location of the one or more traffic lights includes using the image information or the images and using the vehicle location from the vehicle data obtained from the two or more vehicles at the intersection.

In addition to one or more of the features described herein, the method also includes obtaining additional information from one or more other sources. The additional information includes a surveyed location of the one or more traffic lights and the one or more other sources including the two or more vehicles relaying a message from the intersection, a municipal traffic center information system, or a commercial traffic center information system.

In addition to one or more of the features described herein, the method also includes determining a consensus between the location of the one or more traffic lights determined using the vehicle data from the two or more vehicles at the intersection and the surveyed location obtained from the additional information using a standard deviation or a median absolute deviation.

In addition to one or more of the features described herein, the method also includes proceeding with the providing the location of the one or more traffic lights for the operation of autonomous vehicles based on the consensus being greater than a threshold consensus value, and increasing a number of the two or more vehicles from which to obtain the vehicle data based on the consensus being less than the threshold consensus value.

In addition to one or more of the features described herein, the method also includes obtaining SPaT observations for the one or more traffic lights from the two or more vehicles based on the image information or the images and determining, based on a consensus among the SPaT observations from the two or more vehicles being greater than a first threshold value, whether the SPaT of the one or more traffic lights is static such that the SPaT is always the same or is dynamic such that the SPaT changes based on traffic flow or time of day.

In addition to one or more of the features described herein, the method also includes obtaining movement-based SPaT for the one or more traffic lights based on the vehicle location and the vehicle speed indicated in the vehicle data from the two or more vehicles and determining a consensus between the SPaT observations and the movement-based SPaT.

In addition to one or more of the features described herein, the method also includes, based on the consensus between the SPaT observations and the movement-based SPaT being greater than a second threshold value, proceeding with the providing the SPaT of the one or more traffic lights based on the SPaT of the one or more traffic lights being static and proceeding with the providing the SPaT of the one or more traffic lights along with a confidence value that decays with reduced recent-ness of reporting of vehicle data to the management system based on the SPaT of the one or more traffic lights being dynamic.

In addition to one or more of the features described herein, the method also includes determining the lane correspondence based on the vehicle location and the image information or the images from the two or more vehicles.

In addition to one or more of the features described herein, the providing the at least one of the three types of information about the one or more traffic lights for the operation of autonomous vehicles is as an application program interface (API) or as an augmented map.

In another exemplary embodiment, a system to perform traffic signal management for operation of autonomous vehicles includes a communication module to obtain vehicle data from two or more vehicles at an intersection with one or more traffic lights. The vehicle data includes vehicle location, vehicle speed, and image information or images. The system also includes a processor to determine at least one of three types of information about the one or more traffic lights based on the vehicle data, the three types of information including a location of the one or more traffic lights, a signal phase and timing (SPaT) of the one or more traffic lights, and a lane correspondence of the one or more traffic lights, and to provide the at least one of the three types of information about the one or more traffic lights for the operation of autonomous vehicles.

In addition to one or more of the features described herein, the processor determines the location of the one or more traffic lights using the image information or the images and using the vehicle location from the vehicle data obtained from the two or more vehicles at the intersection.

In addition to one or more of the features described herein, the communication module obtains additional information from one or more other sources, the additional information including a surveyed location of the one or more traffic lights and the one or more other sources including the two or more vehicles relaying a message from the intersection, a municipal traffic center information system, or a commercial traffic center information system.

In addition to one or more of the features described herein, the processor determines a consensus between the location of the one or more traffic lights using the vehicle data from the two or more vehicles at the intersection and the surveyed location obtained from the additional information using a standard deviation or a median absolute deviation.

In addition to one or more of the features described herein, the processor provides the location of the one or more traffic lights for the operation of autonomous vehicles based on the consensus being greater than a threshold consensus value, and increases a number of the two or more vehicles from which to obtain the vehicle data based on the consensus being less than the threshold consensus value.

In addition to one or more of the features described herein, the processor obtains SPaT observations for the one or more traffic lights from the two or more vehicles based on the image information or the images and to determine, based on a consensus among the SPaT observations from the two or more vehicles being greater than a first threshold value, whether the SPaT of the one or more traffic lights is static such that the SPaT is always the same or is dynamic such that the SPaT changes based on traffic flow or time of day.

In addition to one or more of the features described herein, the processor obtains movement-based SPaT for the one or more traffic lights based on the vehicle location and the vehicle speed indicated in the vehicle data from the two or more vehicles and determines a consensus between the SPaT observations and the movement-based SPaT.

In addition to one or more of the features described herein, based on the consensus between the SPaT observations and the movement-based SPaT being greater than a second threshold value, the processor provides the SPaT of the one or more traffic lights based on the SPaT of the one or more traffic lights being static and to provide the SPaT of the one or more traffic lights along with a confidence value that decays with reduced recent-ness of reporting of vehicle data to the management system based on the SPaT of the one or more traffic lights being dynamic.

In addition to one or more of the features described herein, the processor determines the lane correspondence based on the vehicle location and the image information or the images from the two or more vehicles.

In addition to one or more of the features described herein, the processor provides the at least one of the three types of information about the one or more traffic lights for the operation of autonomous vehicles as an application program interface (API) or as an augmented map.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
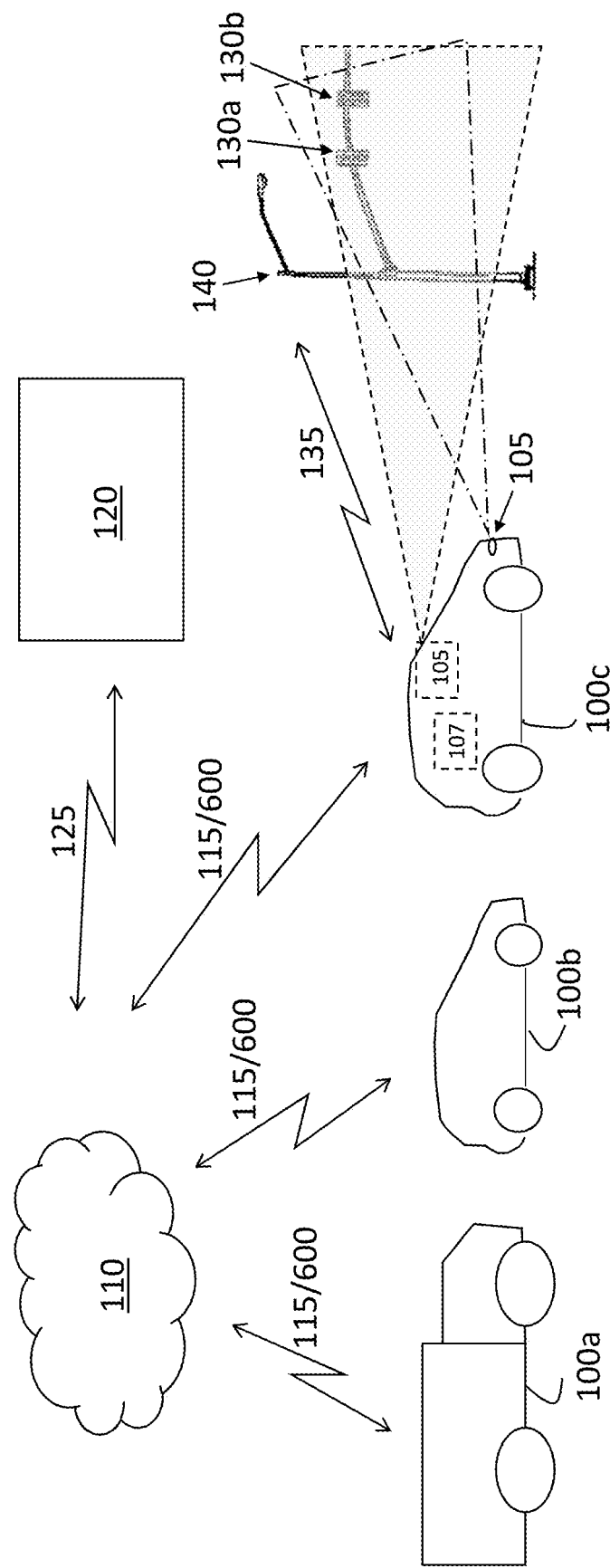
FIG. 1 is a block diagram of a system that facilitates traffic signal management for autonomous vehicle operation according to one or more embodiments.

The following description is merely exemplary in nature and is not intended to limit the present disclosure, its application or uses. It should be understood that throughout the drawings, corresponding reference numerals indicate like or corresponding parts and features.

As previously noted, autonomous vehicles must obtain information conveying the real-time scenario and must act or react to that information in a timely manner. Any prior knowledge that reduces the real-time processing required of the autonomous vehicle may ensure the timely actions required for safe and efficient operation. Embodiments of the systems and methods detailed herein relate to traffic signal management for autonomous operation. The traffic signal management may be cloud-based according to the exemplary embodiment detailed herein. In the specific context of an intersection with a traffic light, three types of information may be provided to an approaching autonomous vehicle. This information may be in the form of an application program interface (API) or may be used to augment the map that autonomous vehicles use to navigate.

The first of the three types of information is the location of the traffic light in global coordinates (i.e., latitude, longitude, elevation). This information facilitates faster acquisition of the location of the traffic light in the field of view of the autonomous vehicle. Such information mitigates the time and computational resources it would take to search for the location of the traffic light. The second type of information is the timing model of the traffic light (e.g., signal phase and timing (SPaT) model). This information indicates the duration of each light and may aid in decision-making (e.g., speed control in advance of an intersection approach) or facilitate quicker reaction to a light turning green, for example (e.g., engagement of start/stop function or resuming automated driving function from a stop). The third type of information indicates the specific traffic light (i.e., set of two or three lights) that corresponds with each lane at an intersection when there is more than one set of lights at a given intersection. The three types of information are independent such that only one or two of the types of information may be available at a given intersection rather than all three.

In accordance with an exemplary embodiment, FIG. 1 is a block diagram of a system that facilitates traffic signal management for autonomous vehicle operation. Three exemplary vehicles 100a, 100b, 110c (generally referred to as 100) are shown. Any or all of the vehicles 100 may be operated autonomously. One of the exemplary vehicles 100a is a truck and the other two exemplary vehicles 100b, 100c are automobiles. As shown for the vehicle 100c, each of the vehicles 100 may include one or more cameras 105, and a vehicle controller 107. The exemplary cameras 105 shown in FIG. 1 are not intended to limit the numbers or locations of cameras 105 in alternate embodiments. As further discussed, one or both of the cameras 105 may provide raw images for processing or may provide information from obtained images. FIG. 1 indicates two sets of traffic lights 130a, 130b (generally referred to as 130) and indicate that both are in the exemplary field of view (FOV) shown in dashed lines for the cameras 105.

The vehicle controller 107 may be a collection of vehicle controllers 107 that communicate with each other to perform the functionality discussed herein. The vehicle controller 107 may perform or facilitate communication functions as well as autonomous control functions. The communication may include vehicle-to-infrastructure (V2I) communication that includes the exchange of dedicated short range communication (DSRC) messages 135 with a smart intersection 140, such as the one that includes the traffic lights 130 in the example of FIG. 1. The DSRC messages 135 may convey specifications of the traffic lights 130 such as the timing pattern for operation of the lights or SPaT, or local intersection data that indicates which lane 601 (FIG. 6) corresponds with which traffic light 130.

The communication performed or facilitated by the vehicle controller 107 of the vehicle 100 may also include the provision of vehicle data 115 to a management system 110, which may be implemented using a cloud-based server, for example. For example, the vehicle 100 may provide images or information based on processed images using one or both cameras 105. The vehicle controller 107 may obtain other information over a controller area network (CAN) to communicate to the management system 110. The other information may include a location of the vehicle 100 based on a global navigation satellite system (GNSS) (e.g., global positioning system (GPS)), speed, yaw rate, and other location and movement data. The vehicle data 115 may also include the DSRC messages 135 from the smart intersection 140 that are forwarded to the management system 110. The vehicle controller 107 and management system 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the respective described functionality. The vehicle controller 107 and the management system 110 also include a communication module for performing wireless communication according to known communication protocols and schemes.

The management system 110 may obtain the vehicle data 115 from many vehicles 100, as indicated in FIG. 1. Thus, the management system 110 may crowd source data (e.g., location, speed, period of stop, time of stop) from the vehicles 100 that allows the management system 110 to infer the SPaT or lane correspondence of the traffic lights 130 based on the movement pattern of vehicles 100. The management system 110 may exchange information 125 with a commercial or municipal traffic center information system 120 in addition to the vehicles 100. The traffic center information system 120 may provide similar information to the DSRC messages 135 from a smart intersection 140. For example, a commercial entity or municipality may conduct a survey and provide the location of the traffic lights 130. As previously noted, the management system 110 may use the vehicle data 115 and information 125 and processing of the vehicle data 115 and information 125 to provide an API or an augmented map 600 (FIG. 6) to autonomous vehicles 100. As also noted previously, one or more of three types of information may be of particular interest regarding traffic lights 130. The three types of information include the global location of the traffic lights 130, the SPaT indicating the timing pattern of light changes, and the lane correspondence of each traffic light 130.

Figure 2:
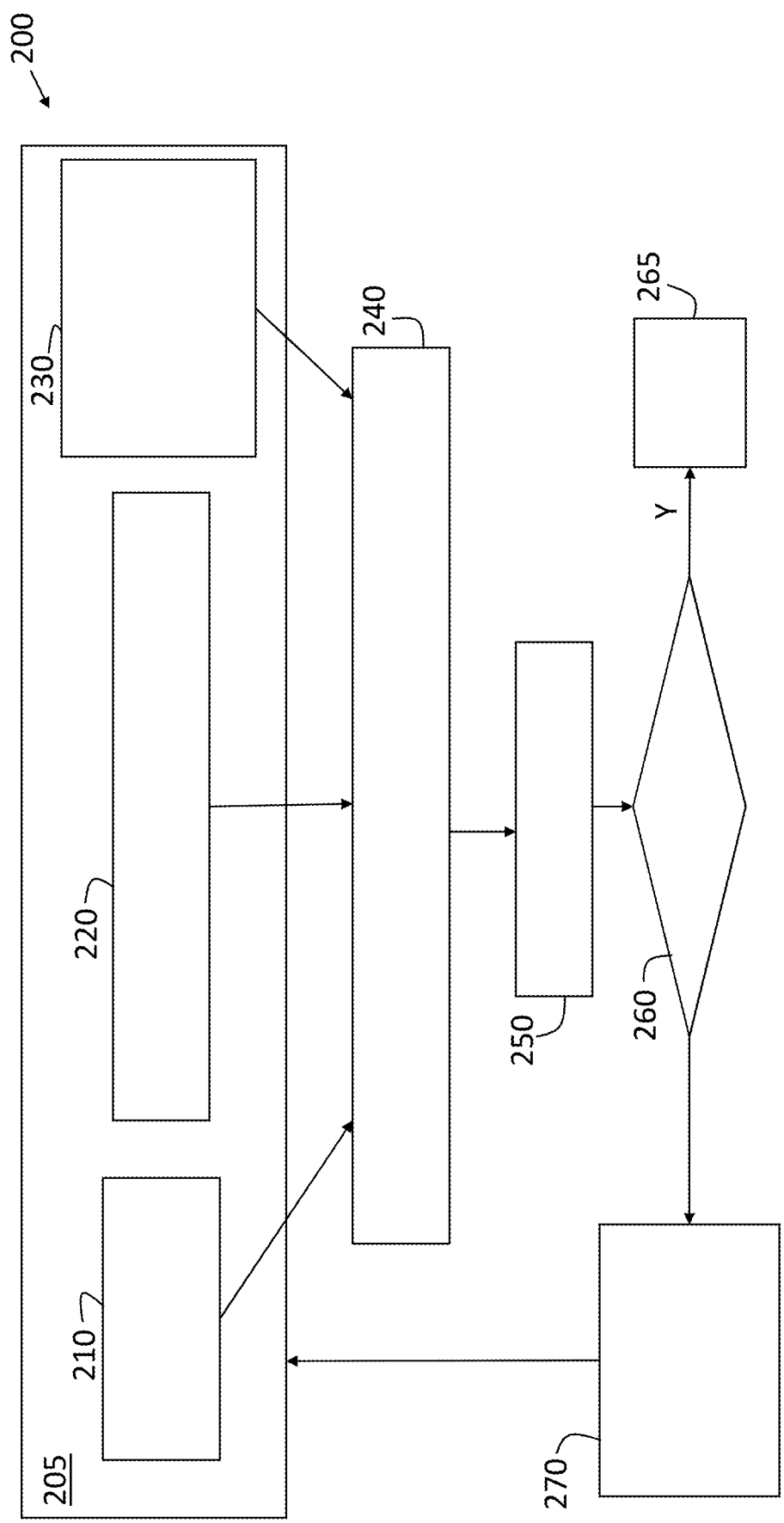
FIG. 2 is a process flow of a method of performing traffic signal management for autonomous vehicle operation by determining a location of a traffic light according to one or more embodiments.

FIG. 2 is a process flow of a method 200 of performing traffic signal management for autonomous vehicle operation according to one or more embodiments. Specifically, the method 200 shown in FIG. 2 pertains to the first type of information that indicates a global location (latitude, longitude, elevation) of the traffic light 130. The processes may be performed by the management system 110 and the application of the processes to a given intersection with one or more traffic lights 130 is discussed for explanatory purposes.

At block 205, obtaining input may include multiple sources. At block 210, obtaining smart intersection information includes obtaining the position of the traffic signals 130 (e.g., based on a survey) at the smart intersection 140 from vehicles 100. If the given intersection is a smart intersection 140, then the vehicles 100 receive V2I communication (e.g., DSRC messages) from the smart intersection 140 and then provide the information to the management system 110. The number of vehicles 100 that upload this information to the management system 110 may be limited (e.g., every other vehicle 100 or every tenth vehicle 100 based on how heavily traveled the smart intersection 140 is). This selective reporting may be controlled by the management system 110 via communication to the vehicles 100 in order to manage communication and computation resources.

Obtaining input, at block 205, may also include obtaining vehicle data 115, at block 220. Vehicle data 115 includes CAN data (e.g., GPS location, speed), and image information or images from vehicles 100. The vehicle data 115 that is provided to the management system 110 by each vehicle 100 may be limited to vehicle data 115 acquired in an acquisition region (e.g., 5 to 15 feet prior to an intersection of interest). This improves system accuracy by only collecting samples at ranges where the range estimate based on the camera is more accurate In addition, the number of vehicles 100 that provide the vehicle data 115 may be controlled by the management system 110 in a selective reporting scheme similar to that discussed with reference to block 210. The image information or images that are part of vehicle data 115 may be obtained by different cameras 105 of each vehicle 100. For example, image information may be information obtained from a camera 105 based on images, while images may be raw images obtained by another camera 105 and that facilitate a three-dimensional (3D) reconstruction of the scene. Either or both types of cameras 105 may be available in a given vehicle 100.

Obtaining input, at block 205, may also include obtaining traffic center information from a commercial and/or municipal traffic center information system 120, at block 230. Like the smart intersection 140, the commercial and/or municipal traffic center information system 120 may provide a surveyed location of the traffic lights 130 or at least the intersection. The traffic center information system 120 may be cloud-based and may perform cloud-to-cloud communication with the management system 110. At block 240, determining latitude, longitude, and elevation of one or more traffic lights 130 at the given intersection refers to obtaining the position based on each of the different inputs available at block 205. In the case of the smart intersection information (at block 210) and the traffic center information (at block 230), the location of the traffic lights 130 may be provided or at least the location at the time of the survey. In the case of the vehicle data 115 (at block 220), the location of the traffic lights 130 may be determined from images or image information, for example. That is, the management system 110 may additionally process the vehicle data 115 to determine the location. The CAN data that is part of the vehicle data 115 (e.g., GPS location of the vehicle 100) facilitates determining which traffic light 130 the location information pertains to.

At block 250, quantifying confidence in the location of the traffic lights 130 refers to cross-validating the location determined (at block 240) from the different input sources (at block 205). A standard deviation, median absolute deviation, or other indicator may be obtained from the location provided by each of the input sources. The vehicles 100 may be treated together (e.g., average of the location indicated by each) or individually for the purpose of cross-validating the location.

At block 260, a check is done of whether the confidence exceeds a threshold value. If it does, providing the location, at block 265, refers to the management system 110 indicating the location of the traffic lights 130 of the given intersection via an API or on a map 600 (FIG. 6), for example, for use by autonomous vehicles 100. If, based on the check at block 260, the confidence does not exceed the threshold, then, at block 270, increasing the number of reporting vehicles 100, refers to controlling the selective reporting. Specifically, more vehicles 100 may be instructed to report smart intersection information (at block 210) or to report vehicle data 115 (at block 220).

Figure 3:
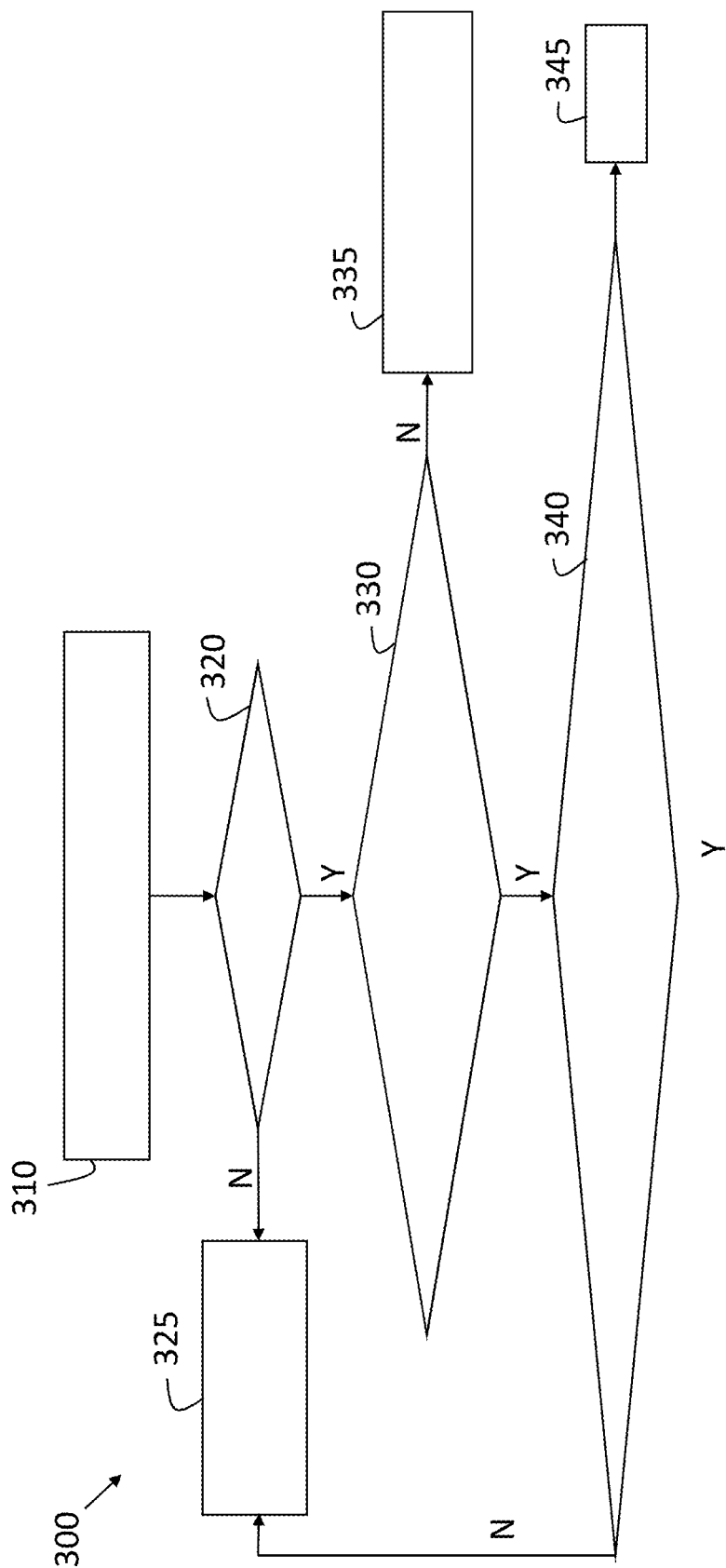
FIG. 3 is a process flow of a method of performing traffic signal management for autonomous vehicle operation by determining a static timing pattern of a traffic light according to one or more embodiments.

FIG. 3 is a process flow of a method 300 of performing traffic signal management for autonomous vehicle operation according to one or more embodiments. Specifically, the method 300 shown in FIG. 3 pertains to the second type of information that indicates a timing pattern or SPaT of the traffic light 130. The processes may be performed by the management system 110 and the application of the processes to a given intersection with one or more traffic lights 130 is discussed for explanatory purposes. Unlike determination of the first type of information, location, discussed with reference to FIG. 2, the determination of SPaT for a traffic light 130 is complicated by the fact that a traffic light 130 may have a static SPaT or a dynamic SPaT. A static SPaT means that the timing pattern by which the traffic light 130 operates is always the same. A dynamic SPaT means that the timing pattern by which the traffic light 130 operates changes. The change may be based on time of day such that there are two or more specific patterns, for example. Alternately, a dynamic SPaT may refer to a traffic light 130 that is operated dynamically according to traffic flow with no specific pattern at all.

Once a SPaT has been determined for a given traffic light 130, the SPaT may be verified and maintained as long as updated SPaT information is provided to the management system 110 within a defined time (i.e., frequently enough). If the updated SPaT information is not provided within the defined time or a SPaT was not already determined for a given traffic light 130, then the processes shown in FIG. 3 are performed. At block 310, obtaining vehicle data 115 from vehicles 100 refers to the management system 110 receiving CAN data (e.g., GPS location, speed) and image information or images from vehicles 100.

At block 320, a check is done of whether the vehicle data 115 (obtained at block 310) is recent enough. If the vehicle data 115 is not recent enough, then any SPaT that was available for the given traffic light 130 is made unavailable, at block 325. This is because the SPaT has not been verified and recent data is not available to verify the SPaT that the management system 110 previously made available for the given traffic light 130. If the vehicle data 115 is recent enough (based on the check at block 320), a determination is made, at block 330, of whether there is consensus among the SPaT observations for a specified duration. SPaT observations are the SPaT determinations at each of the vehicles 100 for the given traffic light 130 according to images or image processing. The specified duration may be two days, for example. The duration facilitates a determination of whether the given traffic light 130 has a static or dynamic SPaT. Consensus may be based on determining whether the standard deviation or other metric is below a threshold value, for example.

If the check at block 330 determines that there is no consensus among the SPaT observations from different vehicles 100 over a specified duration, then the given traffic light 130 may be treated as having a dynamic SPaT, at block 335. This is further discussed with reference to FIG. 4. If it is determined (at block 330) that there is consensus among SPaT observations from vehicles 100 over the specified duration, then a determination is made, at block 340, of whether the SPaT observations agree with movement-based SPaT for the same traffic light 130. Movement-based SPaT refers to the management system 110 inferring the timing pattern of the traffic light 130 based on movement information (e.g., how long the vehicle 100 was stopped at the location of the traffic light 130) that is provided by the vehicles 100 as part of the vehicle data 115. Consensus, at block 340, may be determined based on standard deviation or a similar metric. If the check at block 340 indicates that there is no consensus between SPaT observations and movement-based SPaT, then the process of making any prior SPaT unavailable, at block 325, is performed. If the check at block 340 indicates that there is consensus between SPaT observations and movement-based SPaT, then the management system 110 provides the SPaT of the traffic lights 130 via an API or on a map 600 (FIG. 6), for example, for use by autonomous vehicles 100, at block 345.

Figure 4:
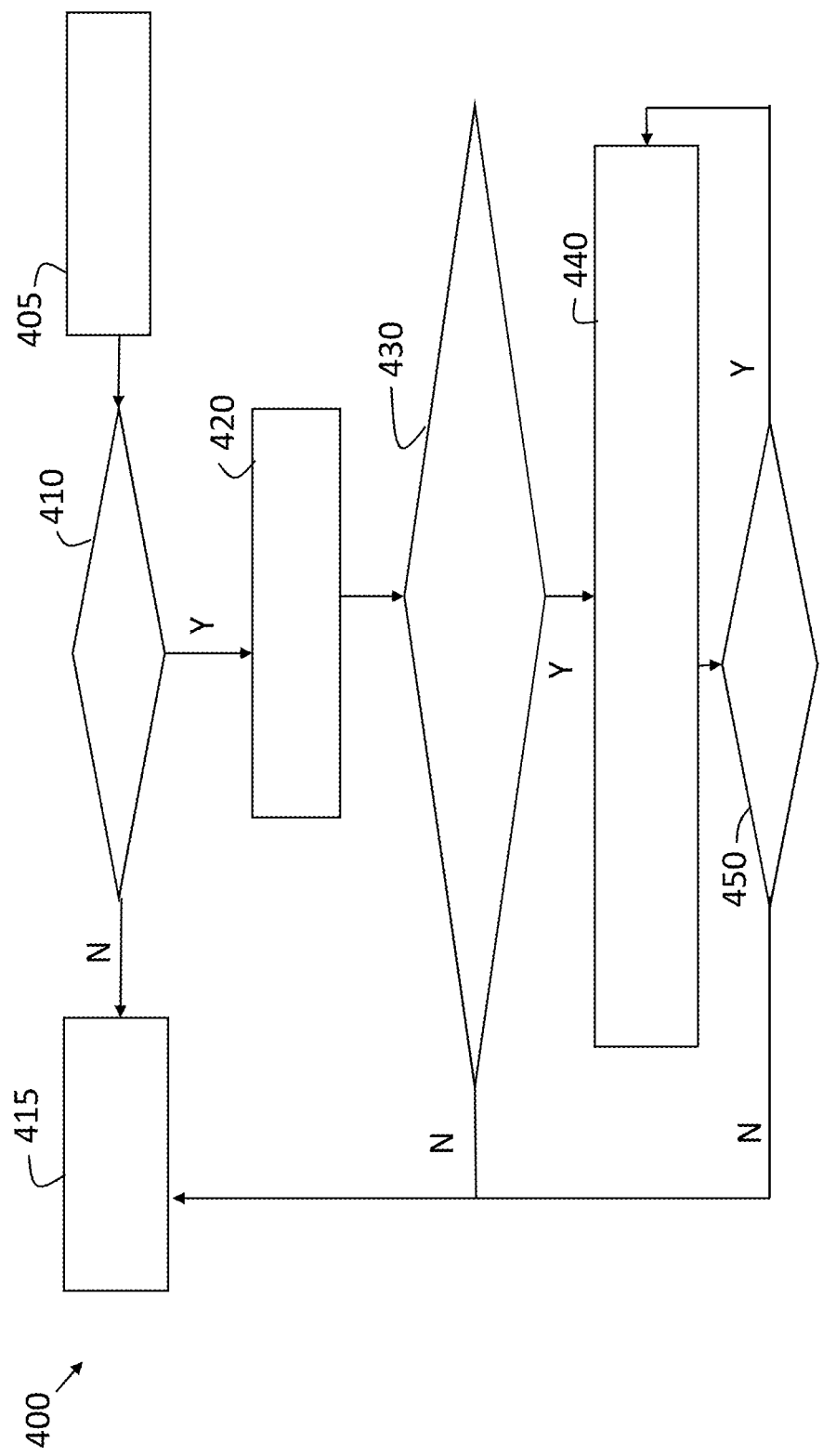
FIG. 4 is a process flow of a method of performing traffic signal management for autonomous vehicle operation by determining a dynamic timing pattern of a traffic light according to one or more embodiments.

FIG. 4 is a process flow of a method 400 of performing traffic signal management for autonomous vehicle operation according to one or more embodiments. Specifically, the method 400 shown in FIG. 4 pertains to the second type of information that indicates a timing pattern or SPaT of the traffic light 130 and, more specifically, the method 400 pertains to a dynamic SPaT. To determine a dynamic SPaT, frequency (e.g., a minimum rate of the management system 110 obtaining observations from vehicles 100), recent-ness (e.g., the age of observations reported to the management system 110), and regularity (e.g., a consistent distribution of the observations reported to the management system 110) are all important factors. This is because, with frequent, recent, and regular inputs, the management system 110 can treat a dynamic SPaT like a static SPaT with a limited duration. As discussed with reference to block 340 (FIG. 3), movement-based SPaT and SPaT observations are examined. A decaying confidence estimate may be provided if the two do not align. In addition, traffic control cycle parameters may be provided to the management system 110 to aid in validating SPaT. Traffic control cycle parameters may include a minimum time for each phase for a given speed limit, for example.

At block 405, vehicle data 115 is obtained from vehicles 100 as inputs to the management system 110. This is similar to the process at block 310 (FIG. 3). At block 410, a check is done of whether the inputs received at the management system 110 from vehicles 100 are sufficiently frequent. The sufficiency may be determined empirically, for example. If the inputs are not frequent enough, then any prior SPaT provided by the management system 110 for the given traffic light 130 is made unavailable, at block 415. If the check at block 410 indicates that inputs are being received frequently enough at the management system 110, then applying the static SPaT method, at block 420, refers to using the method 300 discussed with reference to FIG. 3. As previously noted, sufficiently frequent inputs to the management system 110 facilitate treating a dynamic SPaT like a static SPaT. However, there is an additional feature related to decaying confidence value of the SPaT, as detailed.

At block 430, a check is done of whether SPaT observations from vehicles 100 match with movement-based SPaT determination by the management system 110. This is similar to the check at block 340 (FIG. 3). The determination of a match may be based on a threshold value of standard deviation or another metric, for example. The method 300 shown in FIG. 3 indicates that SPaT is provided (at block 345) for use by autonomous vehicles 100 based on a consensus between SPaT observations and movement-based SPaT (at block 340). However, for dynamic SPaT, the outcome is less straight-forward. If the check at block 430 indicates that SPaT observations do not agree with movement-based SPaT, then the process of making prior available SPaT unavailable, at block 415, is performed. However, if the check at block 440 indicates agreement between SPaT observations and movement-based SPaT, then the processes at block 440 are performed. At block 440, the SPaT is provided for use by autonomous vehicles 100 but with a confidence level. The confidence level is based on recent-ness and regularity of the inputs to the management system 110. Thus, the process at block 440 also includes checking how recent inputs are and decaying the confidence level as inputs become less recent. At block 450, if the check indicates that confidence is not greater than a threshold value, then the process of making prior available SPaT unavailable, at block 415, is performed. As long as confidence is greater than the threshold (according to the check at block 450), then the processes at block 440 are continued.

Figure 5:
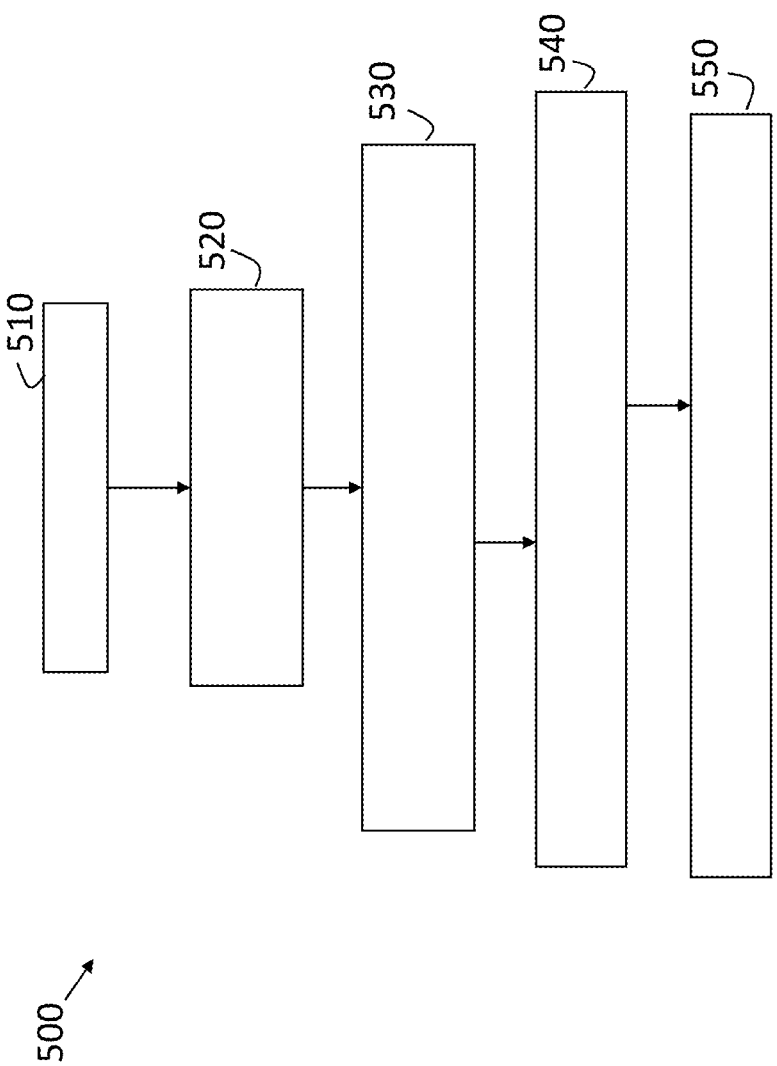
FIG. 5 shows processes that further detail the consensus determination discussed with reference to FIGS. 3 and 4.

FIG. 5 shows processes 500 that further detail the consensus determination at block 340 (FIG. 3) and block 430 (FIG. 4). Thus, continuing reference is made to processes shown in FIGS. 3 and 4. At block 510, accumulating inputs refers to obtaining vehicle data 115 from vehicles 100 at block 310 or block 405. The recent-ness or regularity of the inputs may be verified, as needed. At block 520, creating a training dataset and a validation dataset includes using SPaT observations as the training dataset and using movement-based SPaT as the validation dataset. At block 530, matching SPaT models to the training dataset facilitates finding a best fit model. At block 540, validating the best fit model with the validation dataset results in a confidence level (e.g., based on standard deviation or other metric). At block 550, removing outlier data based on the validation result (at block 540) refers to removing outliers from the input to the management system 110 if the confidence level is below a threshold value, for example.

Figure 6:
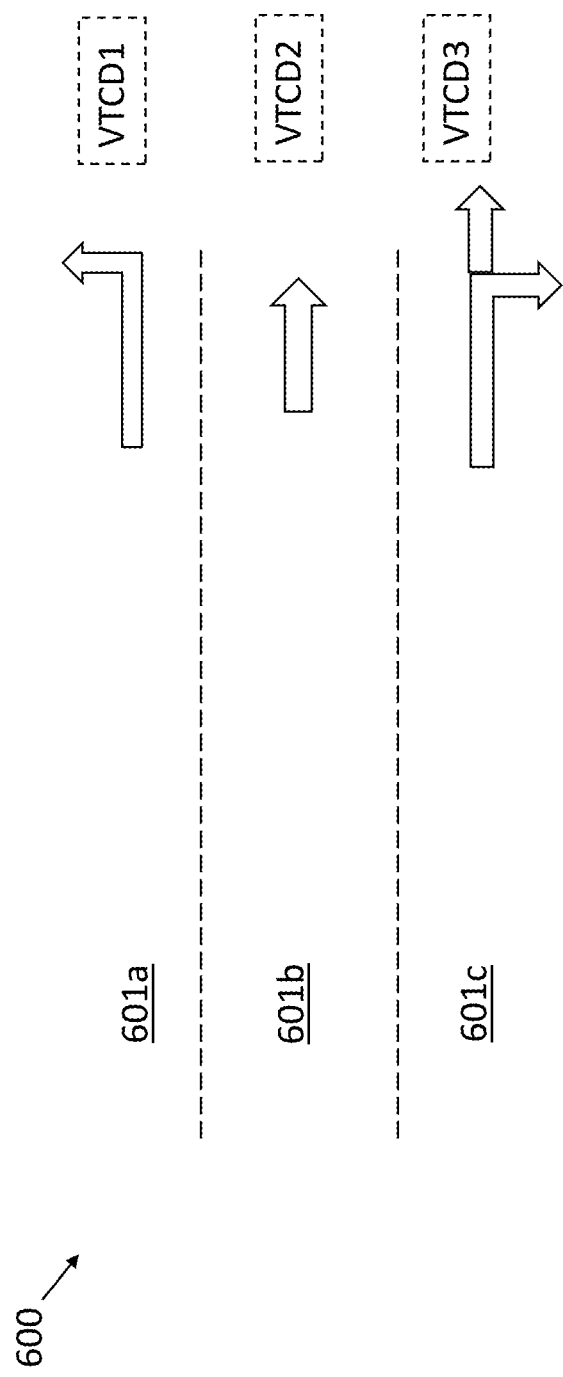
FIG. 6 shows an exemplary map that is augmented based on traffic signal management for autonomous vehicle operation according to one or more embodiments.

FIG. 6 shows an exemplary map 600 that is augmented by the management system 110 to indicate one or more of the three types of information according to one or more embodiments. Three lanes 601a, 601b, 601c (generally referred to as 601) are shown. The direction of travel or turn from each lane 601 is indicated. Each lane 601 is associated with a virtual traffic control device (VTCD) VTCD1, VTCD2, VTCD3. The association of the VTCDs with the lanes 601, the SPaT of the VTCDs, and the global location of each VTCD (i.e., latitude, longitude, elevation) may be indicated on the map 600. Other information (e.g., speed limit) may also be indicated.

The third type of information, lane localization or the specific traffic light 130 that corresponds with each lane 601, may be determined as an extension of the process flow discussed with reference to FIGS. 2-5. Specifically, the CAN data obtained at block 220, for example, provides location and movement of each reporting vehicle 100. In an exemplary scenario, each lane 601 may have a corresponding traffic light 130. In that case, the location of each traffic light 130 (i.e., the first type of information discussed with reference to FIG. 2) may be used to associate the traffic light with a particular lane 601. Even when two or more lanes 601 are controlled by the same traffic light 130, the image information or raw images provided by vehicles 100 may be used by the management system 110 to associate the lanes 601 with the traffic light 130. When SPaT information is available, the movement of vehicles 100 in the different lanes 601, obtained through CAN data that is part of the input to the management system 110, may be used to associate a particular traffic light 130 with a given lane 601. Alternately, lane localization may be achieved without determining the first type (global location) or second type (SPaT) of information. The management system 110 may use vehicle data 115 (e.g., images, image information) to associate lanes 601 with traffic lights 130 without additionally determining the location of the traffic lights 130.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing traffic signal management for operation of autonomous vehicles, the method comprising:
obtaining, at a management system, vehicle data from two or more vehicles at an intersection with one or more traffic lights, the vehicle data including vehicle location, vehicle speed, and image information or images;
determining, at the management system, at least one of three types of information about the one or more traffic lights based on the vehicle data, the three types of information including a location of the one or more traffic lights, a signal phase and timing (SPaT) of the one or more traffic lights, and a lane correspondence of the one or more traffic lights, indicating which lane each of the one or more traffic lights corresponds with, based on the vehicle data from the two or more vehicles, wherein the determining the location of the one or more traffic lights includes determining a consensus between the location determined based on the two or more vehicles and additional information from one or more sources, and the determining the SPaT of the one or more traffic lights includes determining a consensus among the SPaT determined based on the two or more vehicles; and
providing, by the management system, the at least one of the three types of information about the one or more traffic lights for the operation of autonomous vehicles.

2. The method according to claim 1, wherein the determining the location of the one or more traffic lights includes using the image information or the images and using the vehicle location from the vehicle data obtained from the two or more vehicles at the intersection.

3. The method according to claim 2, further comprising obtaining, at the management system, the additional information from the one or more other sources, the additional information including a surveyed location of the one or more traffic lights and the one or more other sources including the two or more vehicles relaying a message from the intersection, a municipal traffic center information system, or a commercial traffic center information system.

4. The method according to claim 3, further comprising determining the consensus between the location of the one or more traffic lights determined using the vehicle data from the two or more vehicles at the intersection and the surveyed location obtained from the additional information using a standard deviation or a median absolute deviation.

5. The method according to claim 4, further comprising proceeding with the providing the location of the one or more traffic lights for the operation of autonomous vehicles based on the consensus being greater than a threshold consensus value, and increasing a number of the two or more vehicles from which to obtain the vehicle data based on the consensus being less than the threshold consensus value.

6. The method according to claim 1, further comprising obtaining SPaT observations for the one or more traffic lights from the two or more vehicles based on the image information or the images and determining, based on the consensus among the SPaT observations from the two or more vehicles being greater than a first threshold value, whether the SPaT of the one or more traffic lights is static such that the SPaT is always the same or is dynamic such that the SPaT changes based on traffic flow or time of day.

7. The method according to claim 6, further comprising obtaining movement-based SPaT for the one or more traffic lights based on the vehicle location and the vehicle speed indicated in the vehicle data from the two or more vehicles and determining a consensus between the SPaT observations and the movement-based SPaT.

8. The method according to claim 6, further comprising, based on the consensus between the SPaT observations and the movement-based SPaT being greater than a second threshold value, proceeding with the providing the SPaT of the one or more traffic lights based on the SPaT of the one or more traffic lights being static and proceeding with the providing the SPaT of the one or more traffic lights along with a confidence value that decays with reduced recent-ness of reporting of vehicle data to the management system based on the SPaT of the one or more traffic lights being dynamic.

9. The method according to claim 1, further comprising determining the lane correspondence based on the vehicle location and the image information or the images from the two or more vehicles.

10. The method according to claim 1, wherein the providing the at least one of the three types of information about the one or more traffic lights for the operation of autonomous vehicles is as an application program interface (API) or as an augmented map.

11. A system to perform traffic signal management for operation of autonomous vehicles, the system comprising:
a communication module configured to obtain vehicle data from two or more vehicles at an intersection with one or more traffic lights, the vehicle data including vehicle location, vehicle speed, and image information or images; and
a processor configured to determine at least one of three types of information about the one or more traffic lights based on the vehicle data, the three types of information including a location of the one or more traffic lights, a signal phase and timing (SPaT) of the one or more traffic lights, and a lane correspondence of the one or more traffic lights, indicating which lane each of the one or more traffic lights corresponds with, based on the vehicle data from the two or more vehicles, wherein the processor is configured to determine the location of the one or more traffic lights by determining a consensus between the location determined based on the two or more vehicles and additional information from one or more sources, and the processor is configured to determine the SPaT of the one or more traffic lights by determining a consensus among the SPaT determined based on the two or more vehicles, and to provide the at least one of the three types of information about the one or more traffic lights for the operation of autonomous vehicles.

12. The system according to claim 11, wherein the processor is configured to determine the location of the one or more traffic lights using the image information or the images and using the vehicle location from the vehicle data obtained from the two or more vehicles at the intersection.

13. The system according to claim 12, wherein the communication module is further configured to obtain the additional information from the one or more other sources, the additional information including a surveyed location of the one or more traffic lights and the one or more other sources including the two or more vehicles relaying a message from the intersection, a municipal traffic center information system, or a commercial traffic center information system.

14. The system according to claim 13, wherein the processor is further configured to determine the consensus between the location of the one or more traffic lights using the vehicle data from the two or more vehicles at the intersection and the surveyed location obtained from the additional information using a standard deviation or a median absolute deviation.

15. The system according to claim 14, wherein the processor is configured to provide the location of the one or more traffic lights for the operation of autonomous vehicles based on the consensus being greater than a threshold consensus value, and is configured to increase a number of the two or more vehicles from which to obtain the vehicle data based on the consensus being less than the threshold consensus value.

16. The system according to claim 11, wherein the processor is configured to obtain SPaT observations for the one or more traffic lights from the two or more vehicles based on the image information or the images and to determine, based on the consensus among the SPaT observations from the two or more vehicles being greater than a first threshold value, whether the SPaT of the one or more traffic lights is static such that the SPaT is always the same or is dynamic such that the SPaT changes based on traffic flow or time of day.

17. The system according to claim 16, wherein the processor is configured to obtain movement-based SPaT for the one or more traffic lights based on the vehicle location and the vehicle speed indicated in the vehicle data from the two or more vehicles and to determine a consensus between the SPaT observations and the movement-based SPaT.

18. The system according to claim 16, wherein, based on the consensus between the SPaT observations and the movement-based SPaT being greater than a second threshold value, the processor is configured to provide the SPaT of the one or more traffic lights based on the SPaT of the one or more traffic lights being static and to provide the SPaT of the one or more traffic lights along with a confidence value that decays with reduced recent-ness of reporting of vehicle data to the management system based on the SPaT of the one or more traffic lights being dynamic.

19. The system according to claim 11, wherein the processor is configured to determine the lane correspondence based on the vehicle location and the image information or the images from the two or more vehicles.

20. The system according to claim 11, wherein the processor is configured to provide the at least one of the three types of information about the one or more traffic lights for the operation of autonomous vehicles as an application program interface (API) or as an augmented map.

* * * * *